United States Patent [19]

Kalversberg et al.

[11] Patent Number: 6,003,306
[45] Date of Patent: Dec. 21, 1999

[54] METHOD AND APPARATUS FOR NITROGEN OXIDE EMISSION OF A DIRECT INJECTION INTERNAL COMBUSTION ENGINE

[75] Inventors: Ronald Kalversberg, Stuttgart; Günter Karl, Esslingen; Roland Kemmler, Stuttgart, all of Germany

[73] Assignee: DaimlerChrysler AG, Stuttgart, Germany

[21] Appl. No.: 08/953,978

[22] Filed: Oct. 20, 1997

[30] Foreign Application Priority Data

Oct. 18, 1996 [DE] Germany .................. 196 43 053

[51] Int. Cl.⁶ .............................. F01N 3/00; F02M 25/06
[52] U.S. Cl. .................. 60/274; 60/278; 60/276
[58] Field of Search ............... 60/274, 276, 278, 60/285, 288, 301

[56] References Cited

U.S. PATENT DOCUMENTS

| | | |
|---|---|---|
| 2,882,873 | 4/1959 | Witzky . |
| 5,085,049 | 2/1992 | Rim et al. .................. 60/278 X |
| 5,086,737 | 2/1992 | Watanabe et al. . |
| 5,201,173 | 4/1993 | Fujimoto et al. .................. 60/278 X |
| 5,365,733 | 11/1994 | Takeshima et al. .................. 60/288 X |
| 5,426,934 | 6/1995 | Hunt et al. .................. 60/278 X |
| 5,564,283 | 10/1996 | Yano et al. .................. 60/278 X |
| 5,595,060 | 1/1997 | Togai et al. .................. 60/278 X |

FOREIGN PATENT DOCUMENTS

| | | |
|---|---|---|
| 195 17 168 A1 | 11/1995 | Germany . |
| 59-101519 | 6/1984 | Japan .................. 60/278 |
| 2 307 311 | 5/1997 | United Kingdom . |
| WO 96/22457 | 7/1996 | WIPO . |

OTHER PUBLICATIONS

Combined Search and Examination Report under Sections 17 and 18(3).

*Primary Examiner*—John E. Ryznic
*Attorney, Agent, or Firm*—Evenson, McKeown, Edwards & Lenahan, P.L.L.C.

[57] ABSTRACT

Direct-injected engines often operate in broad characteristic field areas with stratified charging, with the harmful emissions not being sufficiently reducible by exhaust recirculation means. Nitrogen oxide molecules are not selectively catalytically reducible In oxygen-rich exhaust during stratified combustion; thus a storage catalytic converter is often located in the exhaust stream to adsorb the resultant nitrogen oxide molecules. In order to initiate desorption and reduction of stored nitrogen oxide molecules, a stoichiometric exhaust composition must be created for a certain operating interval. It was previously assumed that stoichiometric air ratios can only be attained with homogeneous carburetion, so that a switch is made to injection on the intake stroke from fuel injection on the compression stroke. In order to produce a method for reducing nitrogen oxide emissions from a direct-injected gasoline engine, which reduces nitrogen molecules during continuous stratified charging, provision is made to increase the exhaust gas circulation rate for the required operating interval, depending on the operating point of the engine, by a certain amount to create a stoichiometric exhaust composition before the adsorption capacity limit of the storage catalytic converter is reached.

13 Claims, 1 Drawing Sheet

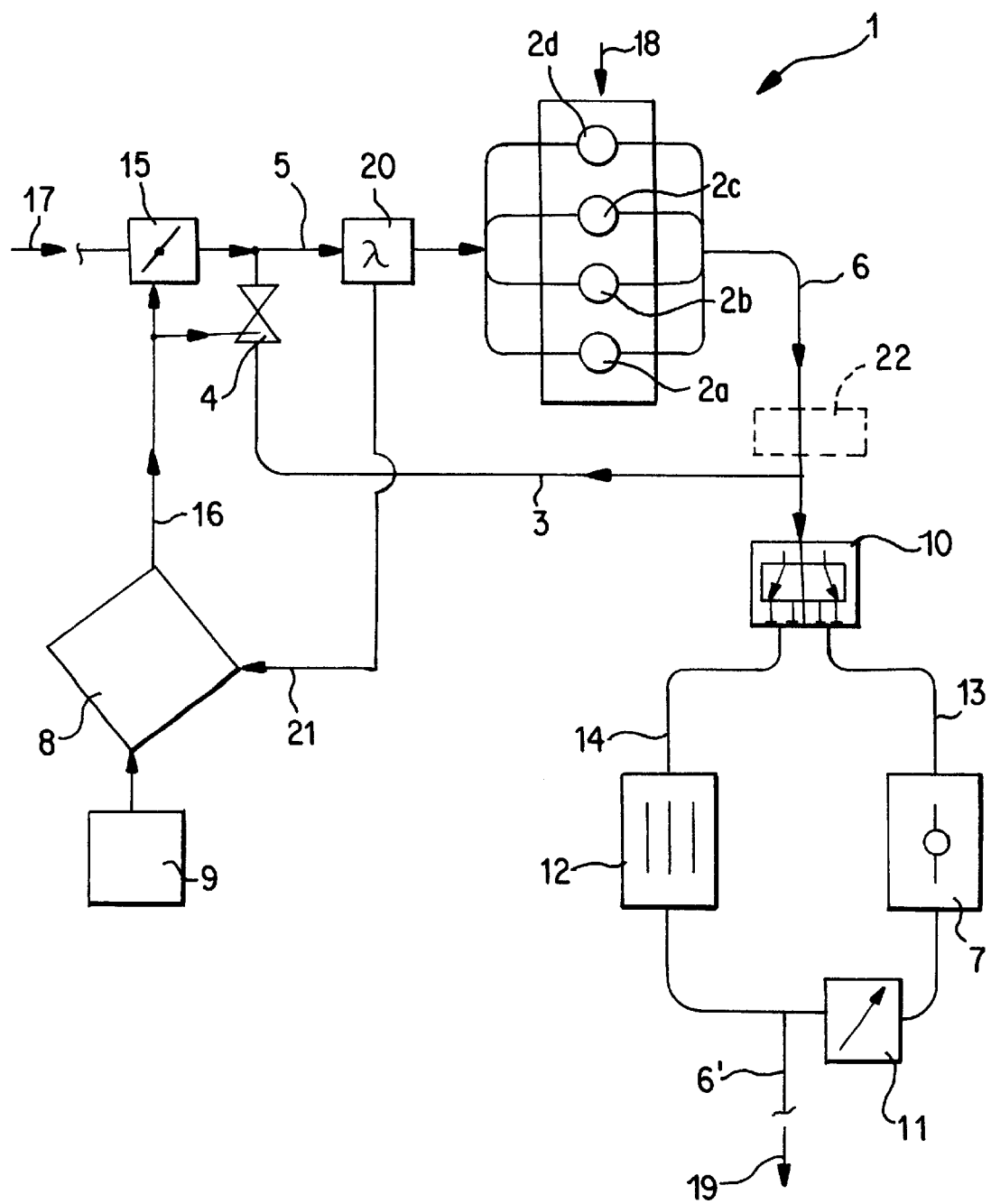

METHOD AND APPARATUS FOR NITROGEN OXIDE EMISSION OF A DIRECT INJECTION INTERNAL COMBUSTION ENGINE

BACKGROUND AND SUMMARY OF THE INVENTION

This application claims the priority of German application No. 19643053.4-13, filed in Germany on Oct. 18, 1996 the disclosure of which is expressly incorporated by reference herein.

The invention relates to a method for reducing nitrogen oxide emissions from a direct-injected gasoline engine operated in broad characteristic field ranges with stratified charging by recirculating exhaust gas during low load conditions and operating the engine with homogenous carburetion and less circulation during high load conditions.

Direct injection of fuel into the cylinders considerably reduces fuel consumption by comparison with other operating methods for a gasoline engine. During the compression stroke, lean combustion takes place during stratified charge operation with fuel injection. Recirculation of a portion of the exhaust stream tapped off the exhaust line and feeding it into the fresh charge line of the engine is a proven method for reducing pollutant emissions, but the cleaning power of this measure is insufficient and the pollutant content of the exhaust that is finally expelled usually is significantly over the legal limit. Catalytic converters located in the exhaust line are conventionally employed to reduce the emissions content in the exhaust but, as in the case of the three-way catalytic converter that is considered to be the most efficient, satisfactory pollutant reduction is only possible at nearly stoichiometric air ratios in a narrow lambda window of approximately lambda=1. During stratified charge operation of a direct-injected gasoline engine with air ratios whose lambda values are significantly greater than 1 and can be as high as approximately 10, catalytic reduction of the nitrogen oxide molecules in the oxygen-rich exhaust is not possible. One known method for processing gases that are rich in NOx is a storage catalytic converter called the DeNOx catalytic converter, which adsorbs the nitrogen oxide molecules that cannot be reduced in oxygen-rich gases. Thus, during stratified charge operation of a direct-injected engine, the nitrogen oxide emissions can be stored in the catalytic converter. To reduce the stored nitrogen oxide molecules to nitrogen, shortly before the adsorption capacity limit of the storage catalytic converter is reached, at the latest, the operating mode of the engine must be adjusted so that oxygen-poor exhaust is formed during combustion, with stoichiometric air ratios (lambda=1).

Previously it was assumed that oxygen-poor exhaust with stoichiometric air ratios of lambda=1 could be obtained during combustion only if homogeneous carburetion was performed. If the engine is operated with the stratified charging that is advantageous in the partial load range, with fuel injection during the compression stroke, it is necessary to switch from this operating mode to operation with homogeneous carburetion, in other words, fuel injection during the intake stroke. During the change from stratified charging to homogeneous carburetion, the engine operates for several working cycles with a fuel/air mixture that is both homogeneous and lean, because of the shift in injection timing. This favors the formation of new nitrogen oxides and a temporary extremely high nitrogen oxide emission occurs that cannot be completely adsorbed by the storage catalytic converter. Moreover, the homogeneous lean mixture is insufficiently ignitable, so that misfiring must be anticipated during the switch from injection during the compression stroke to injection during the intake stroke. Brief rough operation of the engine cannot be prevented because of the asymmetry of the ignition timing during the change from one operating state to the other.

Hence a goal of the invention is to provide a method for reducing nitrogen oxide emissions from a direct-injected gasoline engine, said method being performed during continuous stratified charge operation of the engine.

This goal is achieved according to embodiments of the present invention.

During stratified charge operation of the engine, the exhaust gas recirculation rate into the fresh charge line is increased for an interval of time before the adsorption capacity limit of the storage catalytic converter is reached. Thus, depending on the operating point of the engine, a quantity of exhaust is recirculated such that a stoichiometric composition of the exhaust results following combustion. During this lambda window produced by stratified charge operation, the nitrogen oxide molecules collected in the storage catalytic converter are desorbed and catalytically converted. The duration of the operating interval of the engine with stoichiometric combustion as a result of increased exhaust recirculation depends on the quantity of nitrogen oxide molecules to be reduced, in other words, on the design of the storage catalytic converter in which the nitrogen oxide molecules are adsorbed during stratified charge operation. Desorption of the nitrogen oxide molecules in the storage catalytic converter thus takes place completely during stratified charge operation of the engine with a high exhaust gas recirculation rate, so that reduction in the storage catalytic converter is accelerated by low nitrogen oxide raw emission during combustion.

A throttle valve is located in the fresh charge line upstream of the point where the exhaust recirculation line joins it, the position of said valve regulating the fresh charge flow though the fresh charge line. The composition of the combustion air that is recycled to the cylinders of the engine and is composed of fresh air and recirculated exhaust can thus be regulated by both the exhaust recirculation valve in the exhaust recirculation line and the throttle valve. During stratified charge operation of the internal combustion engine with a low load, the desired exhaust recirculation rate for achieving stoichiometric conditions during combustion with the exhaust gas recirculation valve fully open is controlled by the position of the throttle valve. An adjustable throttle valve reduces the fresh air flow and by producing a vacuum in the fresh charge line, produces a pressure drop between the exhaust line and the fresh charge line that drives exhaust through the exhaust gas recirculation line. In this load range, during stratified charge operation of the internal combustion engine, high exhaust gas recirculation rates are required to achieve stoichiometric air ratios whose delivery is made possible by reducing the fresh air flow.

During stratified charge operation of the internal combustion engine with a high load, the required exhaust gas recirculation rate for producing stoichiometric conditions is controlled by the setting of the opening of the exhaust gas recirculation valve in the exhaust gas recirculation line. Lower exhaust gas recirculation rates are required than for stratified charge operation with a low load, so that the throttle valve is advantageously fully open.

The throttle valve and/or the exhaust gas recirculation valve are especially advantageously individually adjustable by an electronic control unit at each operating point of the engine. As a result of the fresh air flow and/or the recycled exhaust stream settings, stoichiometric conditions are created at every operating point of the engine. The control unit uses a characteristic map to determine the setting parameters stored therein for the respective operating point of the engine and, as a function of these parameters, generates a control signal that is fed to the throttle valve and/or the exhaust gas recirculation valve. Advantageously the control signal can be optimized by either an oxygen sensor in the fresh charge line or a nitrogen oxide sensor in the exhaust line generating a measurement signal that provides information on the oxygen content in the fresh charge or the nitrogen oxide content in the exhaust line, said signal being continuously transmitted to the control unit. When the measurement signal varies from the range of the desired stoichiometric window, the control unit corrects the control signal accordingly, adjusting the exhaust gas recirculation rate.

In an improvement on the invention, at a high operating load or during full load operation of the engine, following fuel injection into the cylinders, homogeneous carburetion takes place which in this load range of the engine results in a higher power output. One advantageous property of homogeneous combustion is the production of exhaust gases with a stoichiometric composition, so that nitrogen emissions can be broken down catalytically without preliminary measures.

Advantageously the exhaust line is divided into branches guided parallel to one another, with the storage catalytic converter being located in one branch and a multifunctional catalytic converter being located in the other branch. A controllable distributing valve is located in the entrance to the branches, with the exhaust from the engine flowing through one of the branches depending on the position of said valve. The distributing valve advantageously can be set so that the exhaust is conducted fully through one of the branches and hence through one of the catalytic converters, while the other branch is shutoff in each case. During stratified charge operation of the engine, the distributing valve is set so that the exhaust flows completely through the partial load branch in which the storage catalytic converter is located. The nitrogen oxide molecules contained in oxygen-rich exhaust are adsorbed in the storage catalytic converter and according to the invention are desorbed during the production of stoichiometric exhaust compositions by a corresponding increase in the exhaust gas recirculation rate and converted catalytically. During full load operation of the engine with homogeneous carburetion, the distributing valve shuts off the partial load branch and opens the full load branch in which the multifunctional catalytic converter is located. Preferably a three-way catalytic converter is used here, in which selective catalytic reaction of the nitrogen oxides under the conditions that prevail during full load operation of the engine, namely exhaust compositions in a lambda window around the stoichiometric point and relatively high exhaust temperatures, proceed nearly simultaneously with other selective catalytic reactions involving other components of the exhaust.

Downstream from the catalytic converters, the two branches join to form a common section of the exhaust line, with a low structural cost being achieved for the exhaust line from the outlet of the engine unit the exhaust gases are finally expelled from the exhaust line. Advantageously, a shutoff valve is located in the partial load branch of the exhaust line, between the storage catalytic converter and the connection to the full load branch. If the partial load branch is opened by the distributing valve during stratified charge operation of the internal combustion engine, the shutoff valve opens as well. During full load operation, on the other hand, with the flow passing through the full load branch, the shutoff valve closes off the partial load branch downstream from the storage catalytic converter so that the hot exhaust flowing through the full load branch cannot enter the partial load branch and cause excessive harmful heating of the inactive storage catalytic converter.

Other objects, advantages and novel features of the present invention will become apparent from the following detailed description of the invention when considered in conjunction with the accompanying drawing.

BRIEF DESCRIPTION OF THE DRAWING

FIG. 1 shows a chart of one embodiment of the invention.

DETAILED DESCRIPTION OF THE DRAWING

FIG. 1 shows 1 embodiment of the engine. The single figure in the drawing shows an engine 1 into whose cylinders 2a to 2d the fuel supplied by a fuel supply system 18 is injected directly and an ignitable fuel/air mixture is formed with the combustion air supplied through fresh charge line 5. Depending on the operating point of engine 1, the combustion air consists of fresh air 17 and exhaust that is recirculated as a partial flow from exhaust line 6 of engine 1 through an exhaust gas recirculation line 3 to fresh charge line 5. The exhaust gas recirculation rate through exhaust gas recirculation line 3 can be adjusted by an exhaust gas recirculation valve 4 in the exhaust gas recirculation line 3 and/or by a throttle valve 15 located upstream of the connection with exhaust gas recirculation line 3 in fresh charge line 5.

Engine 1 operates for the most part in the characteristic field with charge stratification in cylinders 2a to 2d and during full load operation with homogeneous carburetion. The advantages of stratified charge operation, low fuel consumption for example, are offset by the fact that the nitrogen oxides formed in the oxygen-rich exhaust from stratified combustion cannot be broken down. During stratified charge operation of engine 1, expulsion of these nitrogen oxide molecules is prevented by the fact that the exhaust flows through a storage catalytic converter 7 that adsorbs the nitrogen oxide molecules. Storage catalytic converter 7 is located in a partial load branch 13 of exhaust line 6, which runs parallel to a full load branch 14.

The branching of exhaust line 6 is controlled by a controllable distributing valve 10 which, by blocking the respective other branch 13 or 14 in each case, conducts the exhaust from engine 1 through partial load branch 13 during partial load operation with charge stratification and through full load branch 14 during full load operation with homogeneous carburetion. A three-way catalytic converter 12 is located in full load branch 14, in which converter the exhaust stream from engine 1 is subjected to selective catalytic reaction. Under appropriate reaction conditions, namely combustion air ratios in a lambda window around the stoichiometric point and a corresponding exhaust temperature, the reductions of the primary exhaust pollutants, carbon monoxide, unburned hydrocarbons, and nitrogen oxides, proceed uniformly. These reaction conditions prevail under homogeneous carburetion during full load operation of engine 1 so that with an appropriate setting of distributing valve 10 and flow through full load branch 14 and through three-way catalytic converter 12, complete conversion of the nitrogen oxides contained in the exhaust is achieved.

During stratified charge operation, with lambda values that are considerably in excess of the stoichiometric point, the nitrogen oxides in the oxygen-rich exhaust cannot be converted by a three-way catalytic converter. Distributing valve 10 therefore blocks full load branch 14 and opens partial load branch 13. The carbon monoxide molecules in the exhaust preferably react selectively with oxygen so that the slower reaction of the nitrogen oxide molecules with the carbon monoxide molecules does not take place in the oxygen-rich exhaust from stratified combustion. The nitrogen oxide molecules that cannot be reduced are adsorbed in storage catalytic converter 7 and are thus prevented from entering the atmosphere when finally expelled from exhaust line 6. In order to desorb the nitrogen oxide molecules before the adsorption capacity limit of storage catalytic converter 7 is reached and to initiate chemical reduction, provision is made for increasing the exhaust gas recirculation rate through exhaust gas recirculation line 3. Depending on the operating point of engine 1, the recirculated exhaust flow is increased by an amount such that a combustion air mixture is formed with fresh air flow 17 flowing through throttle valve 15 and is fed to cylinders 2a to 2d, the composition of said air mixture being stoichiometric, in other words, the air ratios lie within the stoichiometric lambda window.

The desired exhaust recirculation rate can be achieved both by a suitable setting of exhaust gas recirculation valve 4 and an associated reduction of the available recirculated exhaust stream, and also by a corresponding adjustment of throttle valve 15 and hence a reduction of the fresh air flow 17 that can be supplied. With stratified charge operation with small load points, high exhaust recirculation rates are necessary to create the stoichiometric combustion conditions for desorption of the nitrogen oxide molecules in storage catalytic converter 7. Such exhaust gas recirculation rates are achieved with exhaust gas recirculation valve 4 completely open by the controllable setting of throttle valve 15. If fresh air flow 17 is reduced by adjusting throttle valve 15, a vacuum is produced in fresh charge line 5 and the pressure drop drives exhaust from exhaust line 6 through exhaust recirculation line 3 into fresh charge line 5. During stratified charge operation with higher load points, lower exhaust gas recirculation rates are necessary to obtain air ratios within the stoichiometric lambda window. These exhaust recirculation rates with throttle valve 15 completely open are achieved by a corresponding opening of exhaust gas recirculation valve 4. Control of the exhaust gas recirculation rate is therefore performed by throttle valve 15 during stratified charge operation of a direct-injected gasoline engine with a low load and by exhaust gas recirculation valve 4 with a nonthrottled fresh air supply with a high load.

Both exhaust gas recirculation valve 4 and throttle valve 15 are controlled by an electronic control unit 8. Control unit 8 adjusts throttle valve 15 and/or exhaust recirculation valve 4 individually for the respective operating point of engine 1. If desorption followed by chemical reduction of nitrogen oxide molecules is to be initiated in storage catalytic converter 7, control unit 8 changes the setting of the shutoff elements. Control unit 8 consults a characteristic field 9 to determine the setting parameters stored therein for the respective operating point of the engine and generates a control signal 16 that is supplied to throttle valve 15 and/or exhaust gas recirculation valve 4. Exact adjustment of the desired exhaust gas recirculation rate is made possible by regulation of control signal 16 and hence regulation of throttle valve 15 and exhaust gas recirculation valve 4. An oxygen sensor 20, located in a section between cylinders 2a to 2d and the opening of exhaust gas recirculation line 3 in fresh charge line 5, measures the air ratios obtained with the current settings for the exhaust gas recirculation rate. The measured lambda values of the combustion air are processed to form a regulating signal 21 that is fed to control unit 8. If the measured air ratio differs from the desired stoichiometric value, control unit 8 corrects control signal 16 accordingly and changes the setting of throttle valve 15 and/or exhaust gas recirculation valve 4. Instead of an oxygen probe 20 in the charge line 5, a nitrogen oxide sensor 22 (shown in dash lines) can also be provided in exhaust line 6 to generate a regulating signal to correct the setting of throttle valve 15 and/or exhaust gas recirculation valve 4 by means of control unit 8.

In order to protect inactive storage catalytic converter 7 against heating to a harmful degree during full load operation with homogeneous carburation, a shutoff valve 11 is located downstream from storage catalytic converter 7 in partial load branch 13. During stratified charge operation of engine 1, shutoff valve 11 opens so that the exhaust flowing through storage catalytic converter 7 is guided into a section 6' of the exhaust line that extends further. When flow takes place through full load branch 14 and three-way catalytic converter 12 during full load operation of the engine, shutoff valve 11 closes partial load branch 13 and prevents the hot exhaust from reaching storage catalytic converter 7. Closed shutoff valve 11 forces the hot exhaust stream into section 6' of exhaust line 6 that extends further, said section being common to both branches 13 and 14. In the end section of exhaust line 6', an exhaust stream 19 is expelled into the atmosphere that is low in pollutants following catalytic treatment.

Although the invention has been described and illustrated n detail, it is to be clearly understood that the same is by way of illustration and example, and is not to be taken by way of limitation. The spirit and scope of the present invention are to be limited only by the terms of the appended claims.

What is claimed is:

1. A method for reducing NOx emissions from a gasoline engine that is direct-injected and is operated in broad characteristic field ranges with stratified charging, in which an adjustable exhaust flow can be recirculated from an exhaust line of the engine to a fresh charge line during stratified charge operation of the engine, the method comprising the steps of:

absorbing NOx molecules into a storage catalytic converter located in the exhaust line; and increasing an exhaust gas recirculation rate into the fresh charge line during a certain interval of stratified charging as a function of an operating point of the engine and as a function of the remaining NOx storage capacity of the storage catalytic converter, thereby creating a stoichiometric composition of exhaust with stratified charging over a wide range of engine operating points, wherein fresh air flow is controllable by a throttle valve located upstream of a point where an exhaust gas recirculation line opens into the fresh charge line, and wherein, during stratified charging, the exhaust gas recirculation rate is controllable by a position of the throttle valve in the fresh charge line at low load and with an exhaust gas recirculation valve fully open.

2. A method according to claim 1, wherein during stratified charge operation of the engine, the exhaust gas recirculation rate is controllable by an open position of an exhaust gas recirculation valve in the exhaust gas recirculation line at high load and with the throttle valve fully open in the fresh charge line.

3. A method according to claim 2, wherein the throttle valve and the exhaust gas recirculation valve are individually adjustable by an electronic control unit.

4. A method according to claim 3, wherein the electronic control unit uses a characteristic field to determine setting parameters stored in the characteristic field for a respective current operating point of the engine and generates a control signal which is supplied to the throttle valve and the exhaust gas circulation valve.

5. A method according to claim 4, wherein the control unit is supplied with a measurement signal, the measurement signal forming a basis for regulating the throttle valve and the exhaust gas circulation valve by corresponding correction of the control signal.

6. A method according to claim 5, wherein the measurement signal is generated by an oxygen probe in the fresh charge line downstream of the exhaust gas circulation line opening to the fresh charge line.

7. A method according to claim 5, wherein the measurement signal is generated by a nitrogen oxide sensor in the exhaust line.

8. A method according to claim 1, wherein said engine includes a plurality of cylinders, and wherein homogeneous carburation takes place in the cylinders at a high operating load and during full-load operation of the engine.

9. A method according to claim 1, wherein, depending on a position of a distributing valve controlling branching of the exhaust line, exhaust flows through either a partial-load branch containing the storage catalytic converter, or through a full-load branch with a three-way catalytic converter.

10. A method according to claim 9, wherein the distributing valve is switchable and opens the partial load branch after closing the full load branch during stratified charging of the engine and opens the full load branch during homogeneous carburation.

11. A method according to claim 9, wherein exhaust is carried away after flowing through one of said branches into a section that combines the partial load branch and the full load branch of the exhaust line.

12. The method according to claim 11, wherein a shutoff valve, located downstream of the storage catalytic converter in the partial load branch, is closed during flow through the full-load branch and is opened when the distributing valve opens the partial-load branch.

13. A method for reducing NOx emissions from a gasoline engine that is direct-injected and is operated in broad characteristic field ranges with stratified charging, in which an adjustable exhaust flow can be recirculated from an exhaust line of the engine to a fresh charge line during stratified charge operation of the engine, the method comprising:

absorbing NOx molecules into a storage catalytic converter located in the exhaust line; and increasing an exhaust gas recirculation rate into the fresh charge line during a certain interval of stratified charging, wherein at a low load, the increasing of the exhaust gas recirculation rate is by controlling a throttle valve in the fresh charge line and having an exhaust gas recirculation valve in an exhaust gas recirculation line open; and at a high load, the increasing of the exhaust gas recirculation rate is by controlling the exhaust gas recirculation valve and having the throttle valve open.

* * * * *